A. S. MACOMBER.
Straw Cutter.
No. 2,119.
Reissued Dec. 5, 1865.
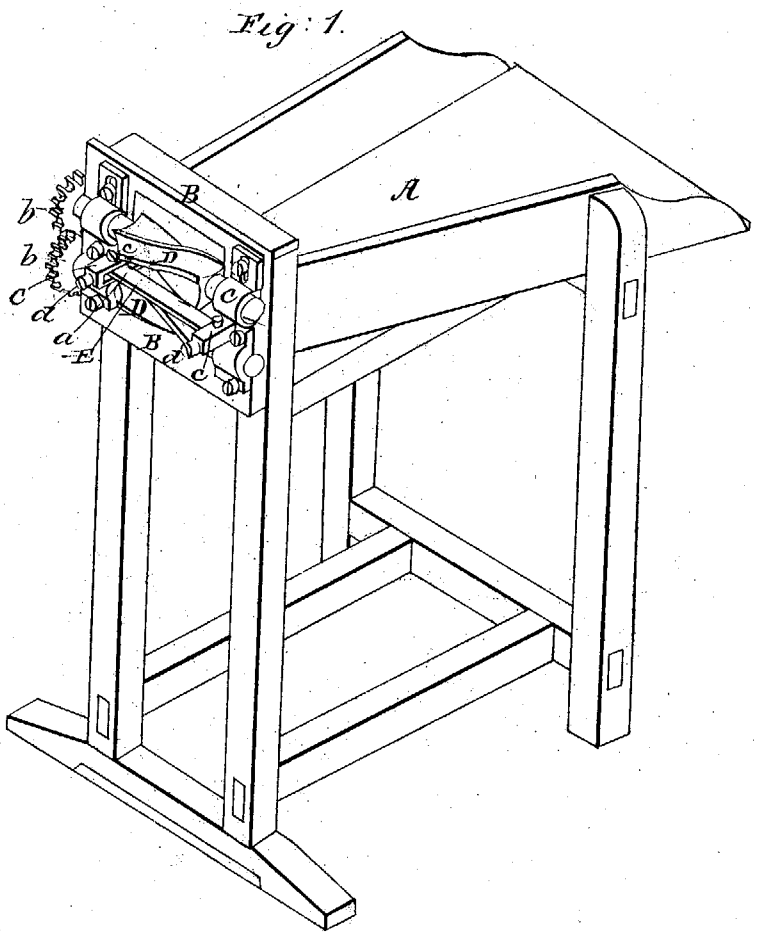
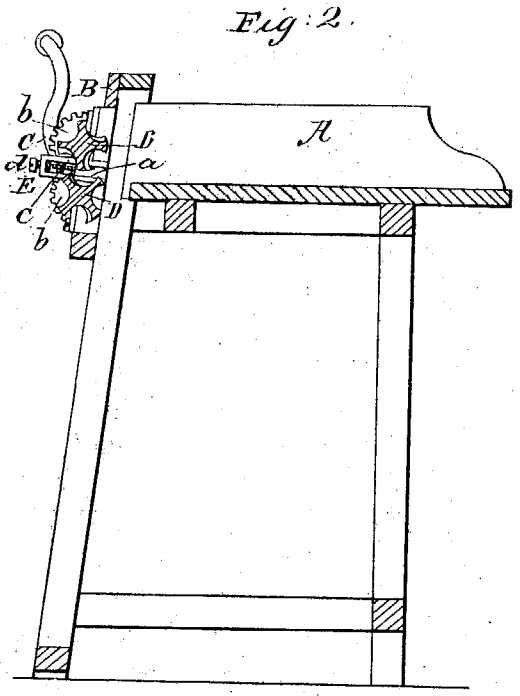
N. PETERS, Photo-Lithographer, Washington, D. C.

UNITED STATES PATENT OFFICE.

WARREN GALE AND ANDREW GALE, OF CHICOPEE FALLS, MASSACHUSETTS, ASSIGNEES, BY MESNE ASSIGNMENTS, OF A. S. MACOMBER.

IMPROVEMENT IN STRAW-CUTTERS.

Specification forming part of Letters Patent No. 7,756, dated November 5, 1850; extended 7 years; Reissue No. 2,119, dated December 5, 1855.

*To all whom it may concern:*

Be it known that A. S. MACOMBER, of Bennington, in the county of Bennington and State of Vermont, invented a new and useful Self-Feeding Machine for Cutting Straw and other Material; and we, WARREN GALE and ANDREW GALE, assignees of the entire right to the said invention, do hereby declare that the following is a full, clear, and exact description thereof, reference being had to the accompanying drawings, making a part of this specification, and to the letters of reference thereon marked.

In the drawings, Figure 1 is an isometrical view. Fig. 2 is a longitudinal vertical section through the center.

The same letters of reference indicate corresponding parts in the several figures.

The nature of said invention consists in using two revolving shafts or cylinders armed with flanges, and placing a stationary blade between (and parallel with) these cylinders, so that the material to be cut, when brought within the range of the cylinders, is caught and forced against the edge of the stationary knife, thus making a self-feeding machine capable of cutting straw, rags, and various other materials.

To enable those skilled in the art to make and use said invention, we will describe its construction and operation.

D D are the two rotary cutters, having any desired number of projections or flanges upon them, varying in number and distance apart according to the degree of fineness it is desired to cut the material to be operated upon. We prefer to make these cylinders D with the projections or flanges arranged spirally around each cylinder, and where great durability is desired they are made of cast iron chilled upon the surface, and their faces are ground to make the corners or edges sharp. The projections of the two cylinders are inclined in opposite directions, and any given projection of one cylinder passes or meshes between two projections of the other cylinder, so that the edges of the projections of one cylinder meet and lap past the edges of the projections of the other cylinder. These cylinders are hung in suitable bearings, so that there shall be a cylinder on each side of the stationary knife. Although we can dispense with gearing, we much prefer to use it, and therefore the cylinders are geared together by cog-wheels *b b* and rotate in opposite directions. The effect of the gearing is to give greater steadiness and precision of motion to the cylinders, and to lessen the strain upon the flanges, and thereby maintain their relative adjustment.

E is the straight sharp-edged stationary knife, which is placed between the two cutters D D, and having its edge set parallel with the axis of the cutters.

There are various modes of arranging the cutters D D and knife E according to the purpose or material for which the machine is to be used. The drawings illustrate one of the most obvious arrangements and is peculiarly adapted for use as a feed-cutter.

A represents a box for containing the straw. B represents a cast-iron mouth secured to the front of the box. C C are two sets of boxes projecting forward from the front of the mouth. In these boxes are hung the cutters D D. The stationary knife E has its ends placed in the mortises *a a* in the boxes C C, and is firmly held and adjusted therein by the set-screws *c c*. We do not, however, limit ourselves to this particular mode of arranging the cutters and knife.

Operation: Rotary motion being given to the cutters, their edges, in their revolution, will draw the material forward against the edge of the stationary knife, and as the edges of the rotary cutters come in contact with and pass or graze the edge of the knife (being only in contact at one point at a time) they will begin cutting the material at one end of the stationary knife and will cut right across the mouth. As soon as the whole of one flange has passed the knife, one of the flanges of the other cutter will begin operating, the cutting always beginning at the same side of the mouth, and each cutter acting alternately with the other. By said invention of the two flanged cylinders acting in connection with the stationary knife there is produced a self-feeding machine for cutting straw, rags, and other materials, which presents the material to be cut in the best position to be cut, and at the same time breaks or softens it so as to make it more easily cut.

Having described said invention, what we claim as new, and desire to secure by Letters Patent, is—

1. the two flanged cylinders D D, or their equivalent, in combination with a stationary knife, E, substantially as described, for the purpose of cutting food, rags, or other materials.

2. Arranging the flanges on one cylinder so that they will meet and lap past the flanges on the other cylinder in machines so constructed that the said cylinders shall operate in combination with a stationary knife, E, substantially as described.

WARREN GALE.
ANDREW GALE.

Witnesses:
J. N. THAYER,
BENJM. BELCHER.